United States Patent Office 3,537,968
Patented Nov. 3, 1970

3,537,968
SYNTHESIS OF 1,1,1-TRICHLOROETHANE USING IONIZING RADIATION
Thomas A. Chamberlin and Gerald L. Kochanny, Jr., Midland, Mich., assignors to The Dow Chemical Company, Midland, Mich., a corporation of Delaware
No Drawing. Filed Sept. 13, 1968, Ser. No. 759,774
Int. Cl. B01j 1/10; C07c 17/00
U.S. Cl. 204—163                                                  7 Claims

ABSTRACT OF THE DISCLOSURE 1,1,1-trichloroethane is prepared by the selective chlorination at elevated temperatures of 1,1-dichloroethane by carbon tetrachloride using ionizing radiation.

BACKGROUND OF THE INVENTION 1,1,1-trichloroethane ($CCl_3CH_3$, methyl chloroform) is very useful as a general chlorinated solvent. A number of methods have been described concerning its manufacture. For instance, Benner et al. (U.S. Pat. 3,059,035) describes a very high temperature continuous chlorination of 1,1-dichloroethane to produce 1,1,1-trichloroethane. Haefner and Conrad (U.S. Pat. 3,019,175) describe the preparation of 1,1,1-trichloroethane by chlorination of 1,1-dichloroethane using chlorine and actinic light. Taylor and Wofford (U.S. Pat. 3,138,643) describes the preparation of trichloroethanes by the thermal vapor phase chlorination of ethane or dichloroethane. However, a mixture of 1,1,1- and 1,1,2-trichloroethanes is obtained.

To circumvent the difficulties of extremely high temperatures and mixtures of reaction products, it would be desirable to have a process whereby high purity 1,1,1-trichloroethane is produced in good yield under simple reaction conditions. To this end the present invention is directed.

SUMMARY OF THE INVENTION 1,1,1-trichloroethane is prepared in good yield by the selective chlorination of 1,1-dichloroethane by carbon tetrachloride. The free radical chlorination may be effected by heating 1,1-dichloroethane in carbon tetrachloride at temperatures of 150 to 400° C. using gamma radiation to initiate the reaction. The pressure under which the reaction occurs is normally the autogenous pressure, though higher pressures may be used if desired. The product is recovered in the normal manner and when analyzed by vapor phase chromatography often consists of 1,1,1-trichloroethane and 1,1,2-trichloroethane in a ratio of 99:1 or better.

The temperature of the reaction is preferably from 200° to about 300° C. At higher temperatures, decomposition of reactants and tar formation are excessive. At lower temperatures the reaction rate is low, though the yield and selectivity are high.

The source of ionizing radiation is suitably a radioactive isotope capable of generating $\gamma$-rays. Other sources of high energy radiation may be used, such as X-ray machines, electron accelerators, etc. Preferred radioactive sources include typically $Cs^{137}$ and $Co^{60}$ and the like. The dose rate of radiation and the time of exposure are not critical and can be varied widely.

The molar ratio of 1,1-dichloroethane to carbon tetrachloride is not critical (see Table I) and can vary from 1:10 to 10:1, the preferred ratio being between 1:5 and 5:1.

SPECIFIC EMBODIMENTS OF THE INVENTION

The following examples illustrate the present invention but are not to be construed as limiting.

EXAMPLE I

Two milliliters of carbon tetrachloride containing 0.40 milliliter of 1,1-dichloroethane was frozen in liquid nitrogen (at about −195°) and oxygen was removed at reduced pressure. The flask was sealed and heated to 206° and subjected to ionizing radiation from a cesium 137 source at a dose of 2 megarads for 3.8 hours. After cooling, the solution was frozen in liquid nitrogen. The flask was opened and the solution was analyzed by vapor phase chromatography. The conversion of 1,1-dichloroethane was 41% and the yield of trichloroethanes was 67%. The ratio of 1,1,1-trichloroethane to 1,1,2-trichloroethane was 115.6.

EXAMPLES 2–7

The examples found in Table I were conducted in the same manner as Example I. In each example, high purity 1,1,1-trichloroethane was obtained.

TABLE I

| Example | Molar ratio, $CHCl_2CH_3/CCl_4$ | Temp., °C. | Dose, Mrad. | Time, hr. | Intensity, Mrad./hr. | Percent conv. of $CHCl_2CH_3$ | Percent yield, $CCl_3CH_3$ | Ratio $CCl_3CH_3/CHCl_2CH_2Cl$ |
|---|---|---|---|---|---|---|---|---|
| 2 | 2.3 | 205 | 2.0 | 3.6 | 0.56 | *7.4 | 79.5 | 172 |
| 3 | 5.7 | 205 | 2.0 | 3.6 | 0.56 | *9.6 | 62.3 | 296 |
| 4 | 0.23 | 275 | 2.0 | 3.8 | 0.53 | 44.6 | 67.4 | 198 |
| 5 | 0.23 | 210 | 8.9 | 17.0 | 0.53 | 41.0 | 67.0 | 99 |
| 6 | 0.23 | 300 | 2.0 | 3.8 | 0.53 | 69.6 | 56.5 | 85.9 |
| 7 | 0.23 | 205 | 2.0 | 43.0 | 0.046 | 30.8 | 88.9 | 239 |

*Conv. based on $CCl_4$.

We claim:
1. A process for the preparation of 1,1,1-trichloroethane wherein 1,1-dichloroethane is reacted by contacting with carbon tetrachloride in the presence of gamma radiation while maintaining the temperature from 150° C. to about 400° C.

2. The process defined in claim 1 wherein the radiation is supplied by a radioactive isotope source.

3. The process defined in claim 2 wherein the source is a cobalt 60 radioisotope.

4. The process defined in claim 2 wherein the source is a cesium 137 radioisotope.

5. The process defined in claim 1 wherein the radiation dose is maintained within the range of 1 to about 10 Mrads.

6. The process defined in claim 1 wherein the molar ratio of 1,1-dichloroethane and carbon tetrachloride is from 1:5 to about 5:1.

7. The process defined in claim 1 wherein the time of reaction is maintained between 3 and 45 hours.

References Cited

UNITED STATES PATENTS

| | | | |
|---|---|---|---|
| 2,865,824 | 12/1958 | Borland et al. | 204—163 |
| 3,078,220 | 2/1963 | Cassatt et al. | 204—163 |
| 3,386,905 | 6/1968 | Kohl et al. | 204—163 |

FOREIGN PATENTS

| | | |
|---|---|---|
| 1,247,287 | 8/1967 | Germany. |

OTHER REFERENCES

Marshall Sittig, "Combine Hydrocarbons and Halogens for Profit," Chemical Process Review No. 10, Noyes Development Corp., Park Ridge, N.J., pp. 92 and 93 Lib. Coll. No. TP 248–H3, S5.

BENJAMIN R. PADGETT, Primary Examiner